United States Patent
Fragoulis et al.

(10) Patent No.: US 11,526,753 B2
(45) Date of Patent: Dec. 13, 2022

(54) SYSTEM AND A METHOD TO ACHIEVE TIME-AWARE APPROXIMATED INFERENCE

(71) Applicant: IRIDA LABS S.A., Patras (GR)

(72) Inventors: Nikos Fragoulis, Patras (GR); Ilias Theodorakopoulos, Aigio (GR)

(73) Assignee: IRIDA LABS S.A., Patras (GR)

( * ) Notice: Subject to any disclaimer, the term of this patent is extended or adjusted under 35 U.S.C. 154(b) by 498 days.

(21) Appl. No.: 16/784,140

(22) Filed: Feb. 6, 2020

(65) Prior Publication Data

US 2020/0257977 A1   Aug. 13, 2020

Related U.S. Application Data

(60) Provisional application No. 62/804,408, filed on Feb. 12, 2019.

(51) Int. Cl.
*G06N 3/06* (2006.01)
*G06N 3/08* (2006.01)
*G06N 3/063* (2006.01)
*G06N 3/04* (2006.01)

(52) U.S. Cl.
CPC .......... *G06N 3/08* (2013.01); *G06N 3/04* (2013.01); *G06N 3/0427* (2013.01); *G06N 3/063* (2013.01); *G06N 3/082* (2013.01)

(58) Field of Classification Search
CPC .......... G06N 3/08; G06N 3/0427; G06N 3/04; G06N 3/063; G06N 3/082
See application file for complete search history.

(56) References Cited

U.S. PATENT DOCUMENTS

| 11,321,613 B2* | 5/2022 | Theodorakopoulos ..... G06N 3/082 |
| 2009/0210218 A1 | 8/2009 | Collobert et al. |
| 2011/0239020 A1 | 9/2011 | Thomas et al. |
| 2018/0132767 A1 | 5/2018 | Rajan et al. |

(Continued)

FOREIGN PATENT DOCUMENTS

| DE | 10208682 A1 | 6/2003 | |
| WO | WO-2017185386 A1 * | 11/2017 | ..... G06F 13/362 |
| WO | WO-2017185391 A1 * | 11/2017 | ..... G06F 15/7867 |

OTHER PUBLICATIONS

Notice of Allowance for U.S. Appl. No. 15/815,171, dated Jan. 12, 2022.

(Continued)

*Primary Examiner* — Cheng Yuan Tseng
(74) *Attorney, Agent, or Firm* — Jason H. Vick; Sheridan Ross, PC

(57) ABSTRACT

An exemplary aspect relates to the field of pattern recognition, and in one exemplary embodiment to the field of image recognition. More specifically, an embodiment relates to the use of deep neural networks for image recognition and how these kinds of pattern classification structures may be augmented in order to become aware of the available computation time, and the available computational resources so as to appropriately adjust the computational complexity of their associated algorithms and consequently their need for computing resources. The methods and systems described herein at least enable more economical and flexible implementations for porting to embedded computing frameworks by respecting their computational resources.

16 Claims, 9 Drawing Sheets

(56) References Cited

U.S. PATENT DOCUMENTS

2018/0137417 A1* 5/2018 Theodorakopoulos .....................
G06N 3/082
2019/0156201 A1* 5/2019 Bichler .................. G06N 3/063

OTHER PUBLICATIONS

Ba, Lei Jimmy et al. "Do Deep Nets Really Need to be Deep?" Advances in Neural Information Processing Systems; NIPS 2014.
Bossard, Lukas et al. "Food-101—Mining Discriminative Components with Random Forests" European Conference on Computer Vision; ECCV 2014.
Cheng, Yu et al. "An Exploration of Parameter Redundancy in Deep Networks with Circulant Projections" IEEE International Conference on Computer Vision; 2015.
Feng, Jiashi et al. "Learning the Structure of Deep Convolutional Networks" The IEEE International Conference on Computer Vision (ICCV), 2015, pp. 2749-2757.
Figurnov, Michael et al. "PerforatedCNNs: Acceleration Through Elimination of Redundant Convolutions" arXiv: 1504.08362v4 [cs.CV]; Oct. 16, 2016.
Gershman, Samuel J., et al. "Computational Rationality: A Converging Paradigm for intelligence in Brains, Minds, and Machines" Science, vol. 349, issue 6245, pp. 273-278; Jul. 17, 2015.
Graves, Alex et al. "Framewise Phoneme Classification with Bidirectional LSTM Networks" Proceedings of International Joint Conference on Neural Networks, Montreal, Canada, Jul. 31-Aug. 4, 2005.
Han, Song et al. "Learning Both Weights and Connections for Efficient Neural Networks" Proceedings of Advances in Neural Information Processing Systems (NIPS), 2015.
He, Kaiming et al. "Deep Residual Learning for Image Recognition" IEEE Conference on Computer Vision and Pattern Recognition (CVPR); 2016.
Hu, Hengyuan et al. "Network Trimming: A Data-Driven Neuron Pruning Approach towards Efficient Deep Architectures" arXiv:1607.03250v1 [cs.NE]; Jul. 12, 2016.
Huiskes, Mark J. et al. "The MIR Flickr Retrieval Evaluation" MIR '08, Oct. 30-31, 2008; Vancouver, British Columbia, Canada; 2008.
Iandola, Forrest N. et al. "SqueezeNet: AlexNet-Level Accuracy with 50x Fewer Parameters and <0.5MB Model Size" arXiv:1602.07360v4 [cs.CV], Nov. 4, 2016.
Krizhevsky, Alex et al. "ImageNet Classification with Deep Convolutional Neural Networks" Communications of the ACM; vol. 60, Issue 6, Jun. 2017.
LeCun, Yann et al. "Deep Learning" Nature vol. 521; May 28, 2015; pp. 436-444.
Russakovsky, Olga et al. "ImageNet Large Scale Visual Recognition Challenge" ImageNet Large Scale Visual Recognition Challenge.; JCV, 2015.
Wen, Wei et al. "Learning Structured Sparsity in Deep Neural Networks" arXiv: 1608.03665v4 [cs.NE]; Oct. 18, 2016.
Yang, Tien-Ju et al. "Designing Energy-Efficient Convolutional Neural Networks Using Energy-Aware Pruning" arXiv preprint arXiv:1611.05128; Published Nov. 16, 2016.
Anwar, Sajid et al. "Structured Pruning of Deep Convolutional Neural Networks" ACM Journal on Emerging Technologies in Computing Systems; vol. 13, No. 3, Article 32; Feb. 2017.
Lin, Min et al. "Network in Network" Neural and Evolutionary Computing; 2014.
Office Action for U.S. Appl. No. 15/815,171, dated Apr. 9, 2021.
Annema, Anne-Johan "Feed-Forward Neural Networks Vector Decomposition Analysis, Modelling and Analog implementation" Springer-Science+Business Media, LLC; 1995.
Butts, J. Adam et al. "A Static Power Model for Architects" IEEE Proceedings 33rd Annual IEEE/ACM International Symposium on Microarchitecture; MICRO-33 2000; 2000.
Nawi, Nazri Mohd et al. "The Effect of Gain Variation in Improving Learning Speed of Back Propagation Neural Network Algorithm on Classification Problems" Symposium on Progress in Information & Communication Technology 2009.
Stepniewski, Slawomir W. et al. "Pruning Backpropagation Neural Networks Using Modern Stochastic Optimisation Techniques" Neural Computing & Applications 5: 76-98; 1997.
Office Action for U.S. Appl. No. 15/815,171, dated Nov. 12, 2020.
Anwar, Sajid et al. "Compact Deep Convolutional Neural Networks with Coarse Pruning" arXiv:1610.09639v1 [cs.LG] Oct. 30, 2016.
Office Action for U.S. Appl. No. 15/815,171. dated Jul. 28. 2021.

* cited by examiner

SYSTEM AND A METHOD TO ACHIEVE TIME-AWARE APPROXIMATED INFERENCE

RELATED APPLICATION DATA

This application claims the benefit of and priority under 35 U.S.C. § 119(e) to U.S. Patent Application No. 62/804,408 filed Feb. 12, 2019, entitled "System and a Method to Achieve Time-Aware Approximated Inference," the entirety of which is incorporated herein by reference.

FIELD

An exemplary aspect relates to the field of pattern recognition, and in one exemplary embodiment to the field of image recognition. More specifically, an embodiment relates to the use of deep neural networks for image recognition and how these kinds of pattern classification structures may be augmented in order to become aware of the available computation time, and the available computational resources so to appropriately adjust the computational complexity of their associated algorithms and consequently their need for computing resources. The methods and systems described herein at least enable more economical and flexible implementations for porting to embedded computing frameworks by respecting their computational resources.

BACKGROUND

In Artificial Intelligence (AI) systems, perception, inference and decision-making incur computational costs that come with delayed action in time-critical cases. That means that systems must consider the expected value and "cost" of computation.

A high-level view of the relationship between the value and cost of inference at different levels of precision is captured schematically in FIG. 1.

Here, the value of computing with additional precision on final actions and cost of delay for computation are estimated in the same units of utility. A net value of action (u*), is derived as the difference between the expected value of action, based on a current analysis, and the cost of computation required to attain that level of analysis. For example, in the situation depicted in FIG. 1, costs increase in a linear manner with the delay for additional computation, while the value of action increases with decreasing marginal returns. Based on similar graphs, an optimal or preferred stopping time (t*) can be determined, in which attempts to compute additional precision come at a net loss in the value of action.

SUMMARY

In order to be able to minimize the cost of delayed decisions, and optimize the net value of action, flexible inference procedures must allow for decisions on ideal or preferred stopping times at a proportionate level of accuracy. One primary component for achieving this is a time-constrained inference scheme, able to produce a results of different values on different times.

The exemplary systems and methods of this technology use a new architecture of special deep neural networks. These networks incorporate properly trained, computational elements of variable computing capacity. These elements are then networked through a properly devised scheme, which incorporates selective interconnection of elements, so to ensure that the overall network features a computational capacity of a certain level and thus a corresponding computational complexity.

For a specific computing platform, this computational complexity corresponds to a computation time of a certain level. Therefore, by controlling the computational complexity, the inference time of a network model as well as its' accuracy can be controlled, by the proper selection of specific neural processing elements.

One component of the overall architecture, is the existence of neural computational elements of controllable computing complexity. The implementation of such modules is possible by using, for example, the concept of Learning Kernel-Activation Module (LKAM) and a system performing the same by using the technique called parsimonious inference. One system appropriate to fulfill this task has been described in U.S. patent application Ser. No. 15/815,171 which is incorporated herein by reference in its entirety. In a parsimonious inference neural net, LKAMs are used to control the activation of computing resources of a neural network layer at runtime, and in turn are assigned a regularization parameter which affects the extent of utilization of computing resources and consequently the quality of the result.

Thus, by using a series of LKAMs of different regularization parameters, one can produce an equal number of computing elements of different gain complexities.

Finally, these computing elements can be associated in various combinations so to form versions of an overall neural network of various complexities corresponding to various algorithmic quality outputs.

Another important aspect of this technology is that a specific combination of computing elements can be altered on-the-fly, that is during the computation phase where information progresses through the consecutive layers of the neural network and before the algorithm reaches a final output. This allows the neural network to produce a more accurate result over time.

Aspects of the technology relate to a method of using a neural network for pattern recognition, the method comprising modifying a Neural Network, by introducing a set of Learning Kernel Activation Modules (LKAM) into at least one layer of the neural network, wherein each LKAM is capable of switching on and off individual convolutional kernels of at least one convolutional layer of the neural network, determining, in a training phase, a plurality of sets of gain factors for each of the LKAMs spanning to one predetermined numerical range, each set of gain factors featuring a specific computational time and accuracy, repeatedly training, in the training phase, each LKAM set with backpropagation for each batch of the training data, updating, in the training phase, LKAM coefficients and buffering model coefficients' updates to perform a single average update of the model's coefficients at the end of each batch, recording, in the training phase, the computational time and recognition accuracy for each set of LKAMs, receiving, in an inference phase, from a system controller an available computation time for the neural network, selecting, in the inference phase, a set of LKAMs for performing pattern recognition with the trained neural network, based on at least comparing the available computation time with the recorded computation times recorded in training phase for each set of LKAMs.

Still further aspects relate to the above method wherein the gain factor, controls the degree of penalization of the use of a number of convolutional kernels, by controlling the value of an additive factor in the cost function and thus enforcing, through training, the use of a certain number of convolutional kernels resulting after training into a certain level of computational complexity, and recognition accuracy.

Still further aspects relate to the above method wherein the LKAM comprises of a special Neural Network module, able to be trained, so to control dynamically the number of active convolutional kernels of a convolutional layer, by switching them on or off, depending on the input to the convolutional layer and by monitoring the input to the convolutional layer.

Still further aspects relate to the above method wherein the recorded computational time and recognition accuracy for each set of LKAMs is mapped to a power consumption for a specific hardware device, or a power consumption for each set of LKAM modules is directly measured on the hardware device.

Still further aspects relate to the above method wherein the plurality of LKAM modules connected to each convolutional layer, provides an equal number of possible configurations for the execution of this layer, each characterized by different computational time, power consumption and result in different accuracy.

Still further aspects relate to the above method wherein an expected accuracy and/or the load of required computations can be altered at any point during the execution time, by selecting an appropriate set of LKAMs.

Still further aspects relate to the above method wherein a power consumption of executing the inference can be altered at any moment during the execution time, by selecting an appropriate set of LKAMs.

Still further aspects relate to the above method wherein a required time or accuracy or power consumption can be altered prior to the completion of the inference phase, by selecting a different set of LKAM modules to undertake the remaining computations.

Aspects of the technology further relate to a non-transitory computer-readable information storage media, having stored thereon instructions, that when executed by one or more processors, cause to be performed a method of using a neural network for pattern recognition, comprising modifying a Neural Network, by introducing a set of Learning Kernel Activation Modules (LKAM) into at least one layer of the neural network, wherein each LKAM is capable of switching on and off individual convolutional kernels of at least one convolutional layer of the neural network, determining, in a training phase, a plurality of sets of gain factors for each of the LKAMs spanning to one predetermined numerical range, each set of gain factors featuring a specific computational time and accuracy, repeatedly training, in the training phase, each LKAM set with backpropagation for each batch of the training data, updating, in the training phase, LKAM coefficients and buffering model coefficients' updates to perform a single average update of the model's coefficients at the end of each batch, recording, in the training phase, the computational time and recognition accuracy for each set of LKAMs, receiving, in an inference phase, from a system controller an available computation time for the neural network, selecting, in the inference phase, a set of LKAMs for performing pattern recognition with the trained neural network, based on at least comparing the available computation time with the recorded computation times recorded in training phase for each set of LKAMs.

Still further aspects relate to the above media wherein the gain factor, controls the degree of penalization of the use of a number of convolutional kernels, by controlling the value of an additive factor in the cost function and thus enforcing, through training, the use of a certain number of convolutional kernels resulting after training into a certain level of computational complexity, and recognition accuracy.

Still further aspects relate to the above media wherein the LKAM comprises of a special Neural Network module, able to be trained, so to control dynamically the number of active convolutional kernels of a convolutional layer, by switching them on or off, depending on the input to the convolutional layer and by monitoring the input to the convolutional layer.

Still further aspects relate to the above media wherein the recorded computational time and recognition accuracy for each set of LKAMs is mapped to a power consumption for a specific hardware device, or a power consumption for each set of LKAM modules is directly measured on the hardware device.

Still further aspects relate to the above media wherein the plurality of LKAM modules connected to each convolutional layer, provides an equal number of possible configurations for the execution of this layer, each characterized by different computational time, power consumption and result in different accuracy.

Still further aspects relate to the above media wherein an expected accuracy and/or the load of required computations can be altered at any point during the execution time, by selecting an appropriate set of LKAMs.

Still further aspects relate to the above media wherein a power consumption of executing the inference can be altered at any moment during the execution time, by selecting an appropriate set of LKAMs.

Still further aspects relate to the above media wherein a required time or accuracy or power consumption can be altered prior to the completion of the inference phase, by selecting a different set of LKAM modules to undertake the remaining computations.

BRIEF DESCRIPTION OF THE DRAWINGS

The exemplary embodiments will be described in detail, with reference to the following figures, wherein.

DETAILED DESCRIPTION

Convolutional Neural Networks
The Exemplary Architecture

Figure 1:
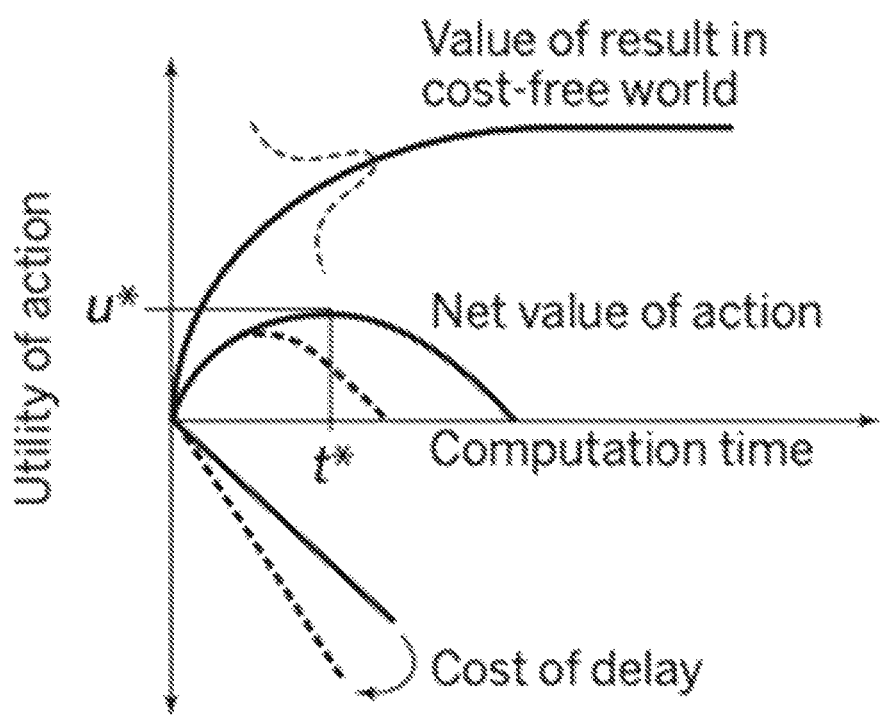
FIG. 1 illustrates the relationship between the value and cost of inference at different levels of precision in AI systems.
Figure 2:
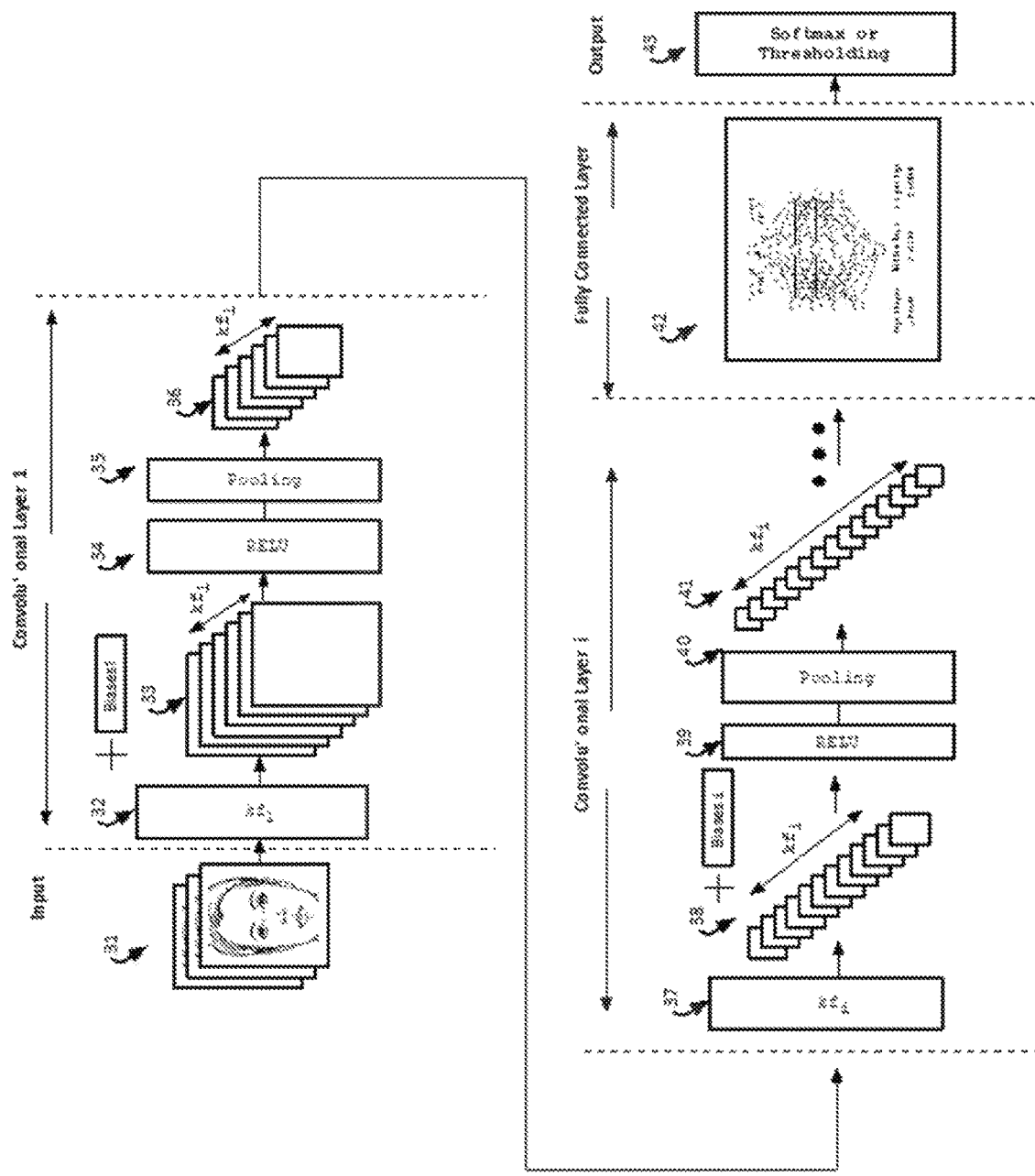
FIG. 2 illustrates a conventional Convolutional Neural Network (CNN) architecture.

FIG. 2 illustrates a conventional CNN architecture which consists of a number of convolutional and subsampling layers occasionally followed by a fully connected neural network layer.

The input 31 to a convolutional network is an image of size m×m×r where m is the height and width of the input image and r is the number of channels, e.g., an RGB image has r=3.

The next stages follow a number of convolutional layers. Convolutional layer 32 and 37 will have $k_{fi}$ filters, or kernels, of size n×n×q where: n is smaller than the dimension of the image, i is the number of the layer, and q can either be the same as the number of channels r, or smaller, and may vary for each kernel. Each of these filters is represented by a 4D matrix (or tensor) of size $k_{fi}$×n×n×q. Each filter performs the following mathematical operation known as convolution:

$$y_{ij'k'} = \Sigma_{ijk} w_{ijkk'} x_{i+i'j+j'k} \qquad (1)$$

The size of the filters gives rise to the locally connected structure which is then convolved with the image to produce $k_{fi}$ feature maps 33 and 38 of size either m×m or smaller.

Each map is then subsampled typically with mean or max pooling over p×p contiguous regions 35 and 40. This is an average or max operation over p×p numbers to calculate the total average or find the maximum of those numbers. The result of these operations is a feature map which is $p^2$ times smaller.

Directly after the convolutions an additive bias and non-linearity (sigmoidal, hyperbolic tangent, etc.) or a rectified linear unit (RELU, leaky RELU, etc.) is applied to each feature map 34 and 39.

After a number L of convolutional layers, there may be any number of fully connected layers 42. These densely connected layers are identical to the layers in a standard fully connected multilayer neural network.

The outputs of such a network is a vector of numbers, from which the probability that a specific input image belongs to the specific class (e.g., the face of a specific person) can be inferred. For that reason, the output layer 43 of the CNN is usually a "softmax" layer which maps the network output vector to class probabilities. But the required type of output should be a single binary decision for the specific image (e.g., is it this specific person) This requires that the output correspond to a specific class to be "1" and for all the other classes to be "0". This is achieved through thresholding on class probabilities: Each output takes the value "0" if smaller than a threshold, and "1" otherwise.

Each convolutional network is defined by its architectural details (e.g., size and number of convolutional kernels, number and kind of pooling units, and connectivity between convolutional layers), as well as its parameters which are the coefficients of the convolutional kernels and the values of biases.

A CNN comprised by more than three layers is named a deep-learning network, and normally the inference accuracy of a CNN increases as the CNN gets deeper. The accuracy obtained by deep architectures on image classification and object detection tasks has proved that depth of representation is indeed the key to a successful implementation.

The number of coefficients required to describe a CNN is directly related to its architecture as defined above: More convolutional layers, means more parameters. Therefore, apart from the required computational complexity, another basic downside of the deep learning CNN architectures is that they require hundreds of megabytes in coefficients for the convolutional kernels to operate. Such requirements can render the embedded implementation of similar networks rather prohibitive, since these coefficients are associated with a large number of memory loads and stores.

As an example, in a typical scenario where a CNN has to operate on a video stream, in order to produce a real-time video annotation captured by a camera sensor, the allocation and data transfers needed are huge (several of GB/sec). This is a rather intense workload for an embedded device's memory, particularly when it has to be completed within a limited time period, (e.g., starting when the user opens the camera app and ending when the video recording starts).

1.2 Networks of Modules

In order to address such issues a different approach could be followed towards the use of a special CNN architecture that requires significantly fewer coefficients. Such a CNN is based on the smart combination of small convolutional kernels and a complex network architecture that enables information to flow through different paths, facilitating the construction of sufficiently high-order image representations that are suitable for the face recognition application. Such approaches result in coefficients that require a couple of megabytes of memory space, which means a reduction of 100 times or more from the scenario described above.

Figure 3:
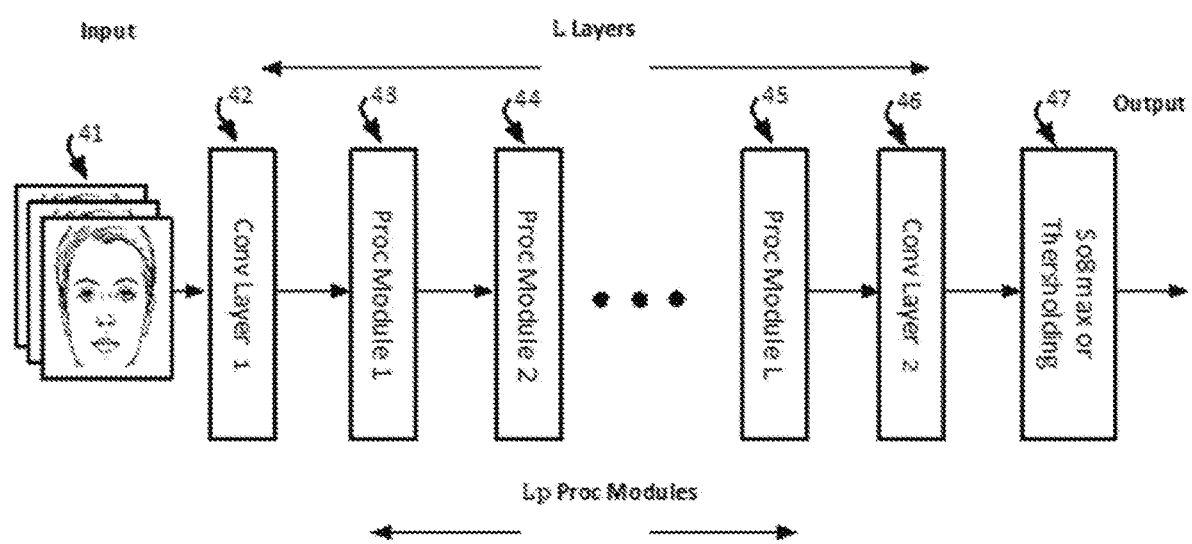
FIG. 3 illustrates a conventional network of modules of a CNN architecture.

FIG. 3 illustrates this alternative conventional network. This CCN architecture is composed of sequential processing cells comprised by L convolutional layers and $L_P$ processing modules. The output of each processing cell is passed for further processing into the next processing cell. The output of the last processing cell 45 is fed into the last stages of the network 46 and 47 which is composed by a number of convolutional or/and full-connected layers that produce the output.

Figure 4:
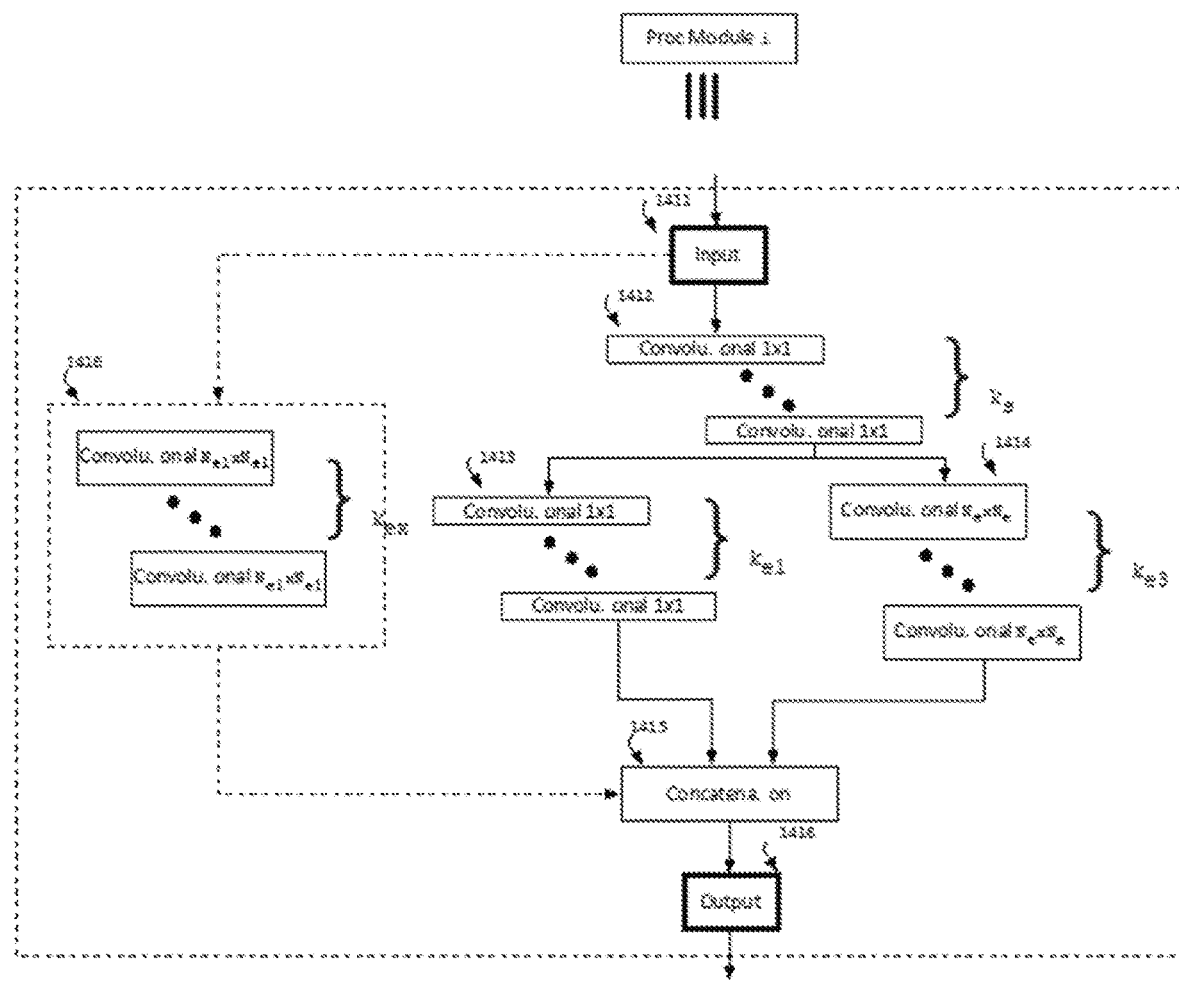
FIG. 4 illustrates the general architecture within all processing modules.

FIG. 4 illustrates the general architecture within all processing modules. In accordance with one implementation of such a module, the input 1411 is initially processed by a block of $K_S$ convolutional layers 1412 based on 1×1 kernels in order to reduce the number of channels. The output of these layers are then directed into a number of blocks of convolutional layers, a number of which (one in an exemplary embodiment—although others are possible) is based on $K_{e1}$ layers based on 1×1 kernels 1413, a number of blocks (one in an exemplary embodiment—although others are possible) comprised by $K_{e3}$ layers based on $N_e$×$N_e$ kernels 1414 and also into a separate block of convolutional layers comprised by $K_{SX}$ layers based on $N_e$×$N_e$ kernels directly feeding the output 1416.

The outputs of all units 1412, 1413 and 1416 are combined by the concatenation unit 1415 via element-wise operations and concatenation of the different channels, producing the output of the processing cell.

Any number of the convolutional layers 1412, 1413, 1414 and 1416 can be substituted by processing sub-cells in other to further reduce the total number of model's coefficients. In an exemplary embodiment of the processing module, the parameters are $K_S$=16, $K_{e3}$=16, $K_{e1}$=16, $K_{eX}$=0, $N_e$=3, although other values are possible.

Time-Aware Inference in Convolutional Neural Networks

Exemplary embodiments describe a system that uses neural network technology and is able to perform inference at a variable degree of accuracy, when allowed to run on a variable amount of time.

Figure 5:
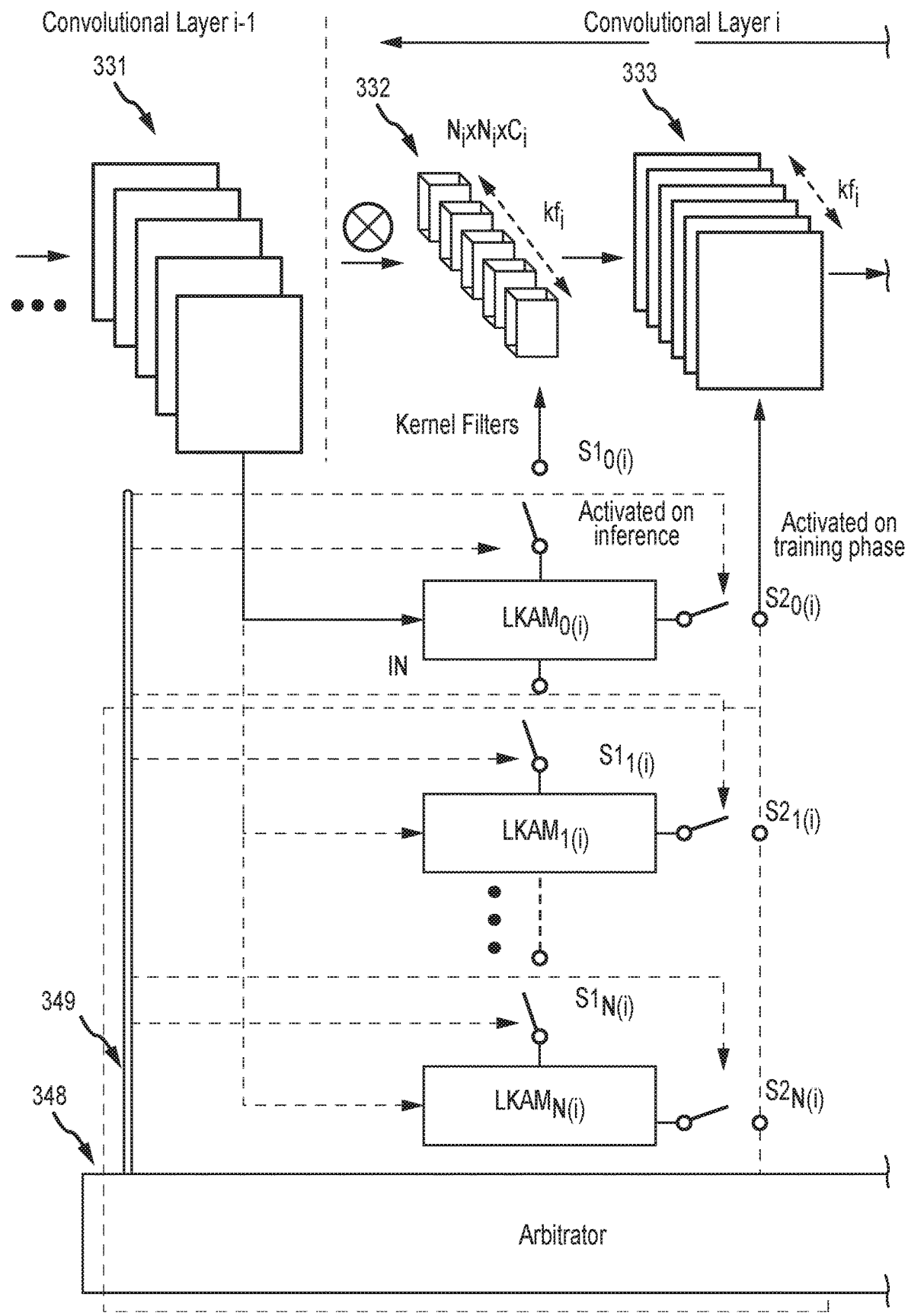
FIG. 5 illustrates an exemplary Time Aware Interference system according to t the disclosed technology.
Figure 5:
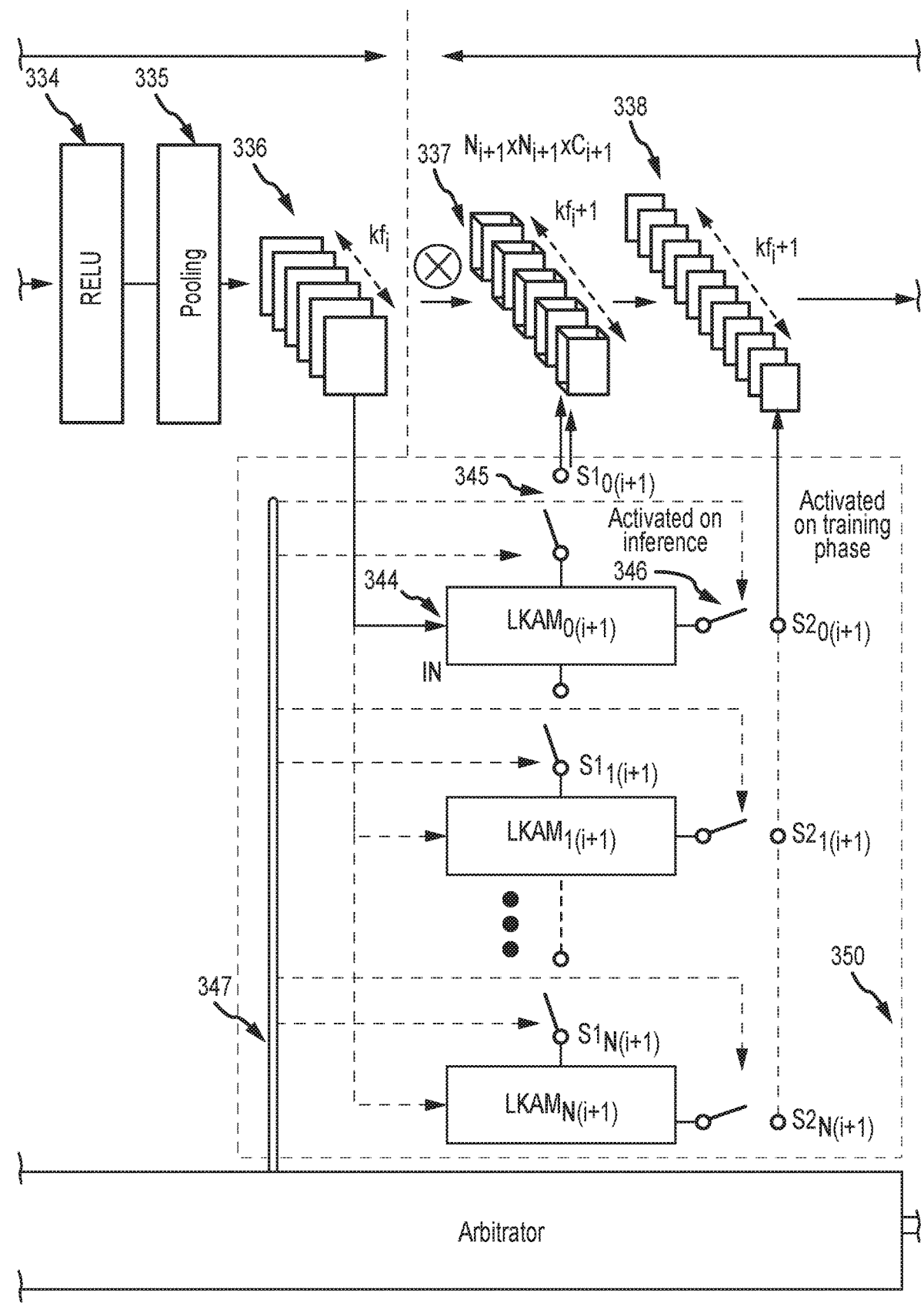
Figure 5:
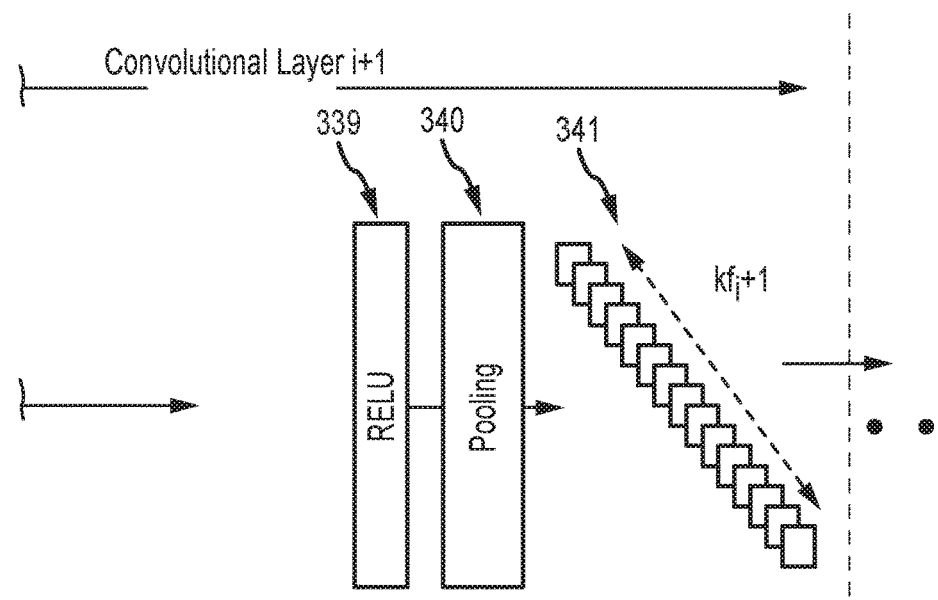

FIG. 5 illustrates an exemplary Time Aware Interference system according to this the disclose technology. In FIG. 5, a snapshot of part of a convolutional network is shown comprised by the i-th and the (i+1)-th layers.

As shown, a Learning Kernel Activation Module (LKAM) 344 is introduced linking two consecutive convolutional layers. Acting as a learning switch, this module is capable of switching on and off individual convolutional kernels in any layer, depending on the input of a specific convolutional layer, which in turn is fed from the output of the convolutional kernel bank of the previous layer.

Figure 6:
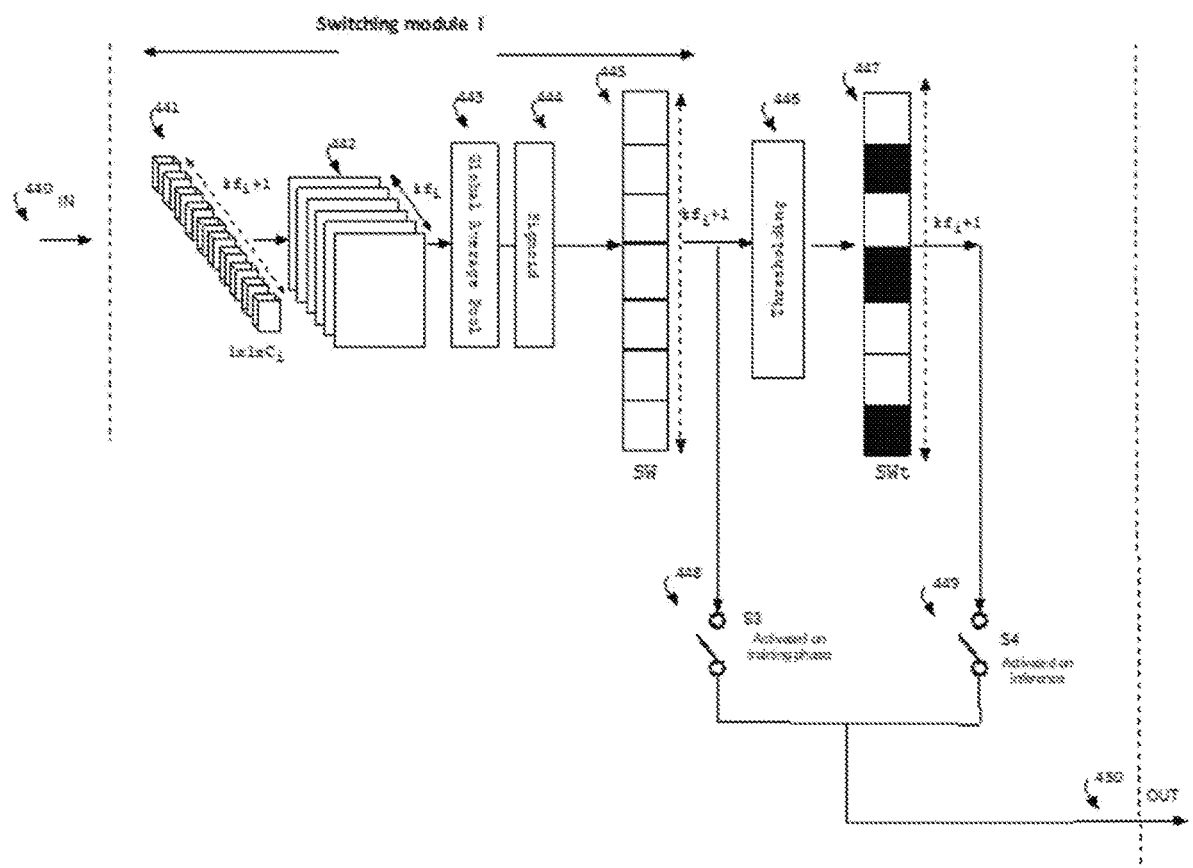
FIG. 6 illustrates an exemplary embodiment of the LKAM module according to the disclosed technology.

FIG. 6 illustrates an exemplary embodiment of the LKAM module according to this the disclosed technology.

First the feature maps of the i-th convolutional layer are fed into this module via input 440. These are processed by a number of $k_{fi}+1$ kernels 441 of size $1\times1\times C_{i+1}$. This process, results into a number of $k_{fi}+1$ feature maps 442. These maps are then fed into a Global Average Pooling block 443 which averages the values of each feature map producing a single number for each feature map. Each of these numbers is then fed into a sigmoid function 445:

$$f(x) = \frac{1}{1 + e^{-k(x-x_0)}} \quad (1)$$

In this way, a vector $SW=\{sw_1, sw_2, \ldots, sw_{k_{fi+1}}\}$ of $k_{fi}+1$ numbers, with values between 0 and 1, is formed.

Determination of the parameters of LKAM involves the calculation of the weights of the $k_{fi}+1$, 1×1 convolutional masks 441 of the LKAM module. This can be achieved through training of the LKAM modules, which takes place concurrently with the training of the rest of the network by means of a training approach using, for example, a backpropagation algorithm (e.g., Stochastic Gradient Descend, AdaDelta, Adaptive Gradient, Adam, Nesterov's Accelerated Gradient, RMSprop, etc.).

During the training phase, switches S2 346 (FIG. 5) and S3 448 (FIG. 6) are activated. In this way, each element of the vector SW multiplies the corresponding feature map in the (i+1)-th convolutional layer. This results in a change in the information flow to some specific feature maps resulting in strengthening of some of them and weakening others.

In order to impose the desirable channel-wise sparsity, the primary loss function used during back-propagation should be augmented with a new term, penalizing the use of convolutional kernels. This is achieved by adding a term proportional to the L1 norm of the SW vectors, denoted as $L_{aug}$ and given by the following equation:

$$L_{aug} = \frac{G_i}{2m} f\left(\sum_i |sw_i|\right) \quad (2)$$

where $G_i$ is a gain factor and m is the length of the vector and $f( )$ is a function of an arbitrary but properly selected shape. In one exemplary embodiment, the function $f(x)=x$ is selected. The overall loss now becomes:

$$L(w,b,sw)=L_t(w,b)+L_{aug}(sw) \quad (3)$$

where $L_t(w,b)$ is the main loss, dictated by the primary task of the model (e.g., Hinge loss, Euclidean etc.). In one aspect of the disclosed technology, by tuning the gain factors $G_i$ one can control the sparsity level separately for each layer. Thus, by varying the parameter $G_i$, one can control the influence of the LKAM into the corresponding convolutional layer, since this makes the overall loss function more sensitive to the number of active neural processing elements.

Approximated, Time-Constrained Inference

Depending on the number of active neural elements, the quality of processing is also affected and so the system ends up with an approximation of the actual result. By performing an iterative training phase that includes a proper selection of parameter $G_i$, the accuracy of the approximation of the overall network can be accurately tuned as a result of a trade-off with the total processing (inference) time. The aforementioned feature is exploited in this technology in order to achieve a neural net that is capable of achieving an approximated inference result of a quality (or accuracy) that is time-dependant.

The construction of such a system starts with a specific neural network model $M_0$. Then this model is appropriately modified so as to include a number $N_{LKAM}$ of LKAMs in appropriate positions. For example, these positions are the layers i and i+1 in FIG. 5 featuring 2 LKAMs ($N_{LKAM}=2$).

Training Phase

The training of such a structure iterates through the following steps:

1. A number $N_{gain}$ of sets of parameters $G_{ik}$, i=1 ... $N_{LKAM}$, k=1 ... $N_{gain}$ (one for each LKAM) is selected. Each of the $N_{gain}$ sets of $N_{LKAM}$ parameters corresponds to a different computation time and recognition accuracy setting.
2. The model undertakes a backpropagation training, as follows:
   For each batch $B_j$ of input training data,
   a. For each set L of $N_{LKAM}$ LKAMs with gains $G_{iL}$, a backpropagation algorithm step is carried out, and the coefficients of the L set of LKAM modules are updated, while the coefficients' updates for the main neural network model $M_{0j}$ are stored to a temporary buffer.
   b. Upon completion of backpropagating errors and updating all the $N_{gain}$ sets of LKAMs, the updates stored in the buffer are averaged together so to form the updates for the main neural network model $M_j$, and the buffer is cleared
   c. The process is repeated for a new training batch $B_{j+1}$, until training is completed.
3. The computation time and accuracy for each of the $N_{gain}$ sets of LKAMs are recorded. The configuration of LKAMs are also recorded.

The number $N_{gain}$ of the different gain sets, defines the granularity of the computational time resolution (and accordingly of the achievable accuracy for each set) of the overall system.

Inference Phase

Each of the LKAMs are connected through an appropriate interconnection network to an arbitrator 348. For an exemplary embodiment, in FIG. 5, this interconnection is implemented through controlled switches via signal busses 347. The arbitrator is receiving control, and more specifically available time information from the overall system control 351, which is then translated into a switch activation pattern, engaging the necessary LKAMs so to make the overall network obey the available computational time.

Application in Networks of Modules

Figure 7:
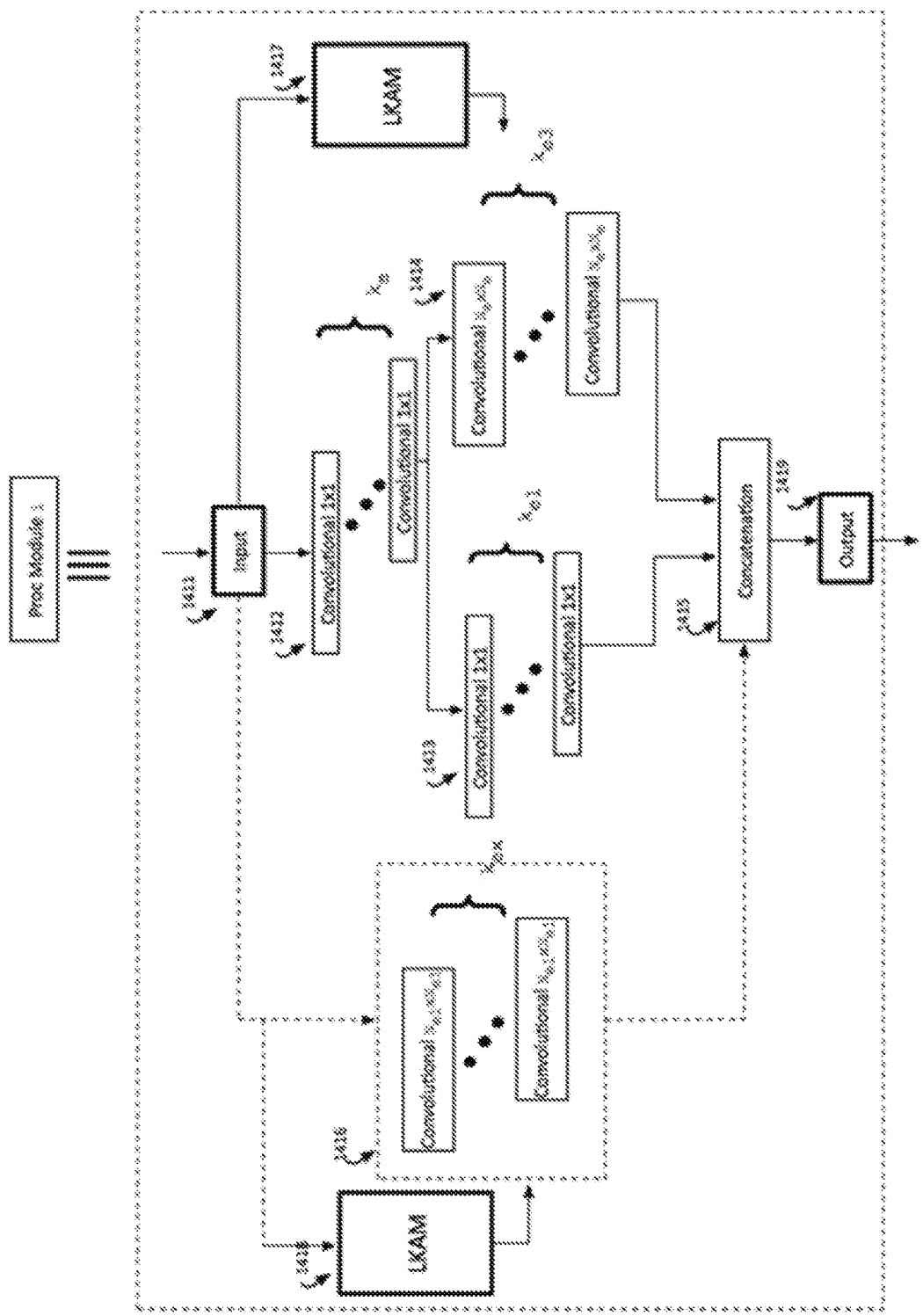
FIG. 7 illustrates an exemplary operation of LKAM on network modules according to the disclosed technology.

FIG. 7 illustrates an exemplary operation of LKAMs on network modules according to one aspect of this technology. In the event that a convolutional neural network is organized to use network modules, LKAMs target to control the activity of the larger convolutional kernel sub-modules 1414 and 1416 inside these modules. In this case the LKAMs 1417 and 1418 share the same input with the corresponding modules they control.

This configuration ensures the maximum possible gain from a potential deactivation of kernels, since a much more significant load corresponds to the larger kernels ($N_e$ is usually equal or larger than 3) than the 1×1 kernels also present within the module.

In this case, time-aware inference methodology is applied as described above, by grouping the individual LKAMs 1414 and 1416 for each parameter set $G_i$.

Additionally, the systems, methods and protocols of one aspect of this technology can be implemented on a special purpose computer, a programmed micro-processor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like. In general, any device capable of implementing a state machine that is in turn capable of implementing the methodology illustrated herein can be used to implement the various methods, protocols and techniques according to this technology.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJS™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed methods may be readily implemented in software on an embedded processor, a micro-processor or a digital signal processor. The implementation may utilize either fixed-point or floating-point operations or both. In the case of fixed-point operations, approximations may be used for certain mathematical operations such as logarithms, exponentials, etc. Alternatively, the disclosed system may be implemented partially or fully in hardware using standard logic circuits or VLSI design. Whether software or hardware is used to implement the systems in accordance with this technology is dependent on the speed and/or efficiency requirements of the system, the particular function, and the particular software or hardware systems or microprocessor or microcomputer systems being utilized. The systems and methods illustrated herein can be readily implemented in hardware and/or software using any known or later developed systems or structures, devices and/or software by those of ordinary skill in the applicable art from the functional description provided herein and with a general basic knowledge of the audio processing arts.

Moreover, the disclosed methods may be readily implemented in software that can be stored on a storage medium, executed on programmed general-purpose computer with the cooperation of a controller and memory, a special purpose computer, a microprocessor, or the like. In these instances, the systems and methods of this technology can be implemented as program embedded on personal computer such as an applet, JAVA.®. or CGI script, as a resource residing on a server or computer workstation, as a routine embedded in a dedicated system or system component, or the like. The system can also be implemented by physically incorporating the system and/or method into a software and/or hardware system, such as the hardware and software systems of an electronic device.

Any non-transitory computer-readable information storage media, having stored thereon instructions, that can be executed by one or more processors and cause to be performed the methods described above.

Finally, the disclosed methods may be readily implemented as services or applications accessible from the user via a web browser. The software can reside in a local server or a remote server. The software may be written in JavaScript utilizing JavaScript Web APIs such as the Web Audio API or make use of Web Assembly.

It is therefore apparent that there has been provided, in accordance with the present technology, systems and methods of achieving time-aware approximated inference convolutional artificial neural networks. While this technology has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this technology.

The invention claimed is:

1. A method of using a neural network for pattern recognition, the method comprising:
   modifying a Neural Network, by introducing a set of Learning Kernel Activation Modules (LKAM) into at least one layer of the neural network, wherein each LKAM is capable of switching on and off individual convolutional kernels of at least one convolutional layer of the neural network,
   determining, in a training phase, a plurality of sets of gain factors for each of the LKAMs spanning to one predetermined numerical range, each set of gain factors featuring a specific computational time and accuracy,
   repeatedly training, in the training phase, each LKAM set with backpropagation for each batch of the training data,
   updating, in the training phase, LKAM coefficients and buffering model coefficients' updates to perform a single average update of the model's coefficients at the end of each batch,
   recording, in the training phase, the computational time and recognition accuracy for each set of LKAMs,
   receiving, in an inference phase, from a system controller an available computation time for the neural network,
   selecting, in the inference phase, a set of LKAMs for performing pattern recognition with the trained neural network, based on at least comparing the available computation time with the recorded computation times recorded in training phase for each set of LKAMs.

2. The method of claim 1, wherein the gain factor, controls the degree of penalization of the use of a number of convolutional kernels, by controlling the value of an additive factor in the cost function and thus enforcing, through training, the use of a certain number of convolutional kernels resulting after training into a certain level of computational complexity, and recognition accuracy.

3. The method of claim 1, wherein the LKAM comprises of a special Neural Network module, able to be trained, so to control dynamically the number of active convolutional kernels of a convolutional layer, by switching them on or off, depending on the input to the convolutional layer and by monitoring the input to the convolutional layer.

4. The method of claim 1, wherein the recorded computational time and recognition accuracy for each set of LKAMs is mapped to a power consumption for a specific hardware device, or a power consumption for each set of LKAM modules is directly measured on the hardware device.

5. The method of claim 1, wherein the plurality of LKAM modules connected to each convolutional layer, provides an equal number of possible configurations for the execution of this layer, each characterized by different computational time, power consumption and result in different accuracy.

6. The method of claim 1, wherein an expected accuracy and/or the load of required computations can be altered at any point during the execution time, by selecting an appropriate set of LKAMs.

7. The method of claim 1, wherein a power consumption of executing the inference can be altered at any moment during the execution time, by selecting an appropriate set of LKAMs.

8. The method of claim 1, wherein a required time or accuracy or power consumption can be altered prior to the completion of the inference phase, by selecting a different set of LKAM modules to undertake the remaining computations.

9. A non-transitory computer-readable information storage media, having stored thereon instructions, that when executed by one or more processors, cause to be performed a method of using a neural network for pattern recognition, comprising:
  modifying a Neural Network, by introducing a set of Learning Kernel Activation Modules (LKAM) into at least one layer of the neural network, wherein each LKAM is capable of switching on and off individual convolutional kernels of at least one convolutional layer of the neural network,
  determining, in a training phase, a plurality of sets of gain factors for each of the LKAMs spanning to one predetermined numerical range, each set of gain factors featuring a specific computational time and accuracy,
  repeatedly training, in the training phase, each LKAM set with backpropagation for each batch of the training data,
  updating, in the training phase, LKAM coefficients and buffering model coefficients' updates to perform a single average update of the model's coefficients at the end of each batch,
  recording, in the training phase, the computational time and recognition accuracy for each set of LKAMs,
  receiving, in an inference phase, from a system controller an available computation time for the neural network,
  selecting, in the inference phase, a set of LKAMs for performing pattern recognition with the trained neural network, based on at least comparing the available computation time with the recorded computation times recorded in training phase for each set of LKAMs.

10. The media of claim 9, wherein the gain factor, controls the degree of penalization of the use of a number of convolutional kernels, by controlling the value of an additive factor in the cost function and thus enforcing, through training, the use of a certain number of convolutional kernels resulting after training into a certain level of computational complexity, and recognition accuracy.

11. The media of claim 9, wherein the LKAM comprises of a special Neural Network module, able to be trained, so to control dynamically the number of active convolutional kernels of a convolutional layer, by switching them on or off, depending on the input to the convolutional layer and by monitoring the input to the convolutional layer.

12. The media of claim 9, wherein the recorded computational time and recognition accuracy for each set of LKAMs is mapped to a power consumption for a specific hardware device, or a power consumption for each set of LKAM modules is directly measured on the hardware device.

13. The media of claim 9, wherein the plurality of LKAM modules connected to each convolutional layer, provides an equal number of possible configurations for the execution of this layer, each characterized by different computational time, power consumption and result in different accuracy.

14. The media of claim 9, wherein an expected accuracy and/or the load of required computations can be altered at any point during the execution time, by selecting an appropriate set of LKAMs.

15. The media of claim 9, wherein a power consumption of executing the inference can be altered at any moment during the execution time, by selecting an appropriate set of LKAMs.

16. The media of claim 9, wherein a required time or accuracy or power consumption can be altered prior to the completion of the inference phase, by selecting a different set of LKAM modules to undertake the remaining computations.

* * * * *